(12) United States Patent
Jones

(10) Patent No.: US 6,984,324 B2
(45) Date of Patent: *Jan. 10, 2006

(54) WASTEWATER TREATMENT

(76) Inventor: David H. Jones, 13131 Moor Park St. Unit 205, Sherman Oaks, CA (US) 91423

( * ) Notice: Subject to any disclaimer, the term of this patent is extended or adjusted under 35 U.S.C. 154(b) by 75 days.

This patent is subject to a terminal disclaimer.

(21) Appl. No.: 10/701,785

(22) Filed: Nov. 5, 2003

(65) Prior Publication Data

US 2004/0144719 A1   Jul. 29, 2004

Related U.S. Application Data

(63) Continuation-in-part of application No. 09/978,960, filed on Oct. 16, 2001, now Pat. No. 6,656,357.

(60) Provisional application No. 60/241,525, filed on Oct. 17, 2000.

(51) Int. Cl.
*C02F 3/00* (2006.01)

(52) U.S. Cl. ...................... 210/610; 210/611; 210/612; 210/613; 210/631; 210/620; 210/749; 210/916

(58) Field of Classification Search ................ 210/610, 210/611, 631, 620, 749, 916, 612–613
See application file for complete search history.

(56) References Cited

U.S. PATENT DOCUMENTS

| 6,656,357 B2 * | 12/2003 | Jones ........................ 210/610 |
| 2004/0094484 A1 * | 5/2004 | Zhuang ...................... 210/721 |

* cited by examiner

*Primary Examiner*—Chester T. Barry
(74) *Attorney, Agent, or Firm*—Eric Fincham

(57) ABSTRACT

A method for the treatment of sewage sludge which comprises the step of applying to the sludge a biologically effective amount of a composition which contains a lignosulfonate and sludge digesting microbes, preferably from the genus *bacillus*. The method may be practiced in sewage treatment plants and also may be used for treatment and odor suppression in holding tanks and the like.

15 Claims, 4 Drawing Sheets

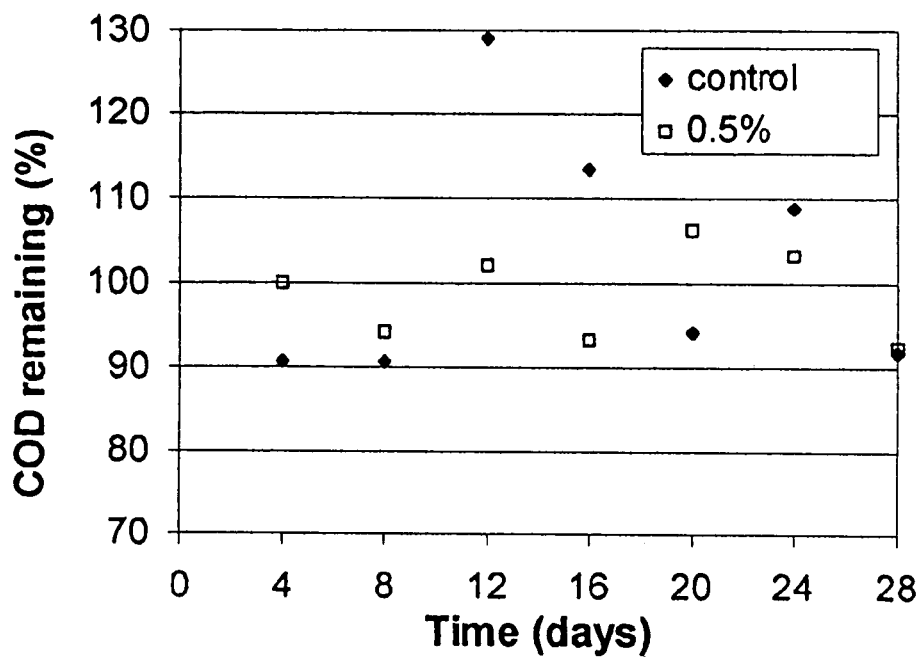
Figure 1 - COD remaining versus time at 8°C.
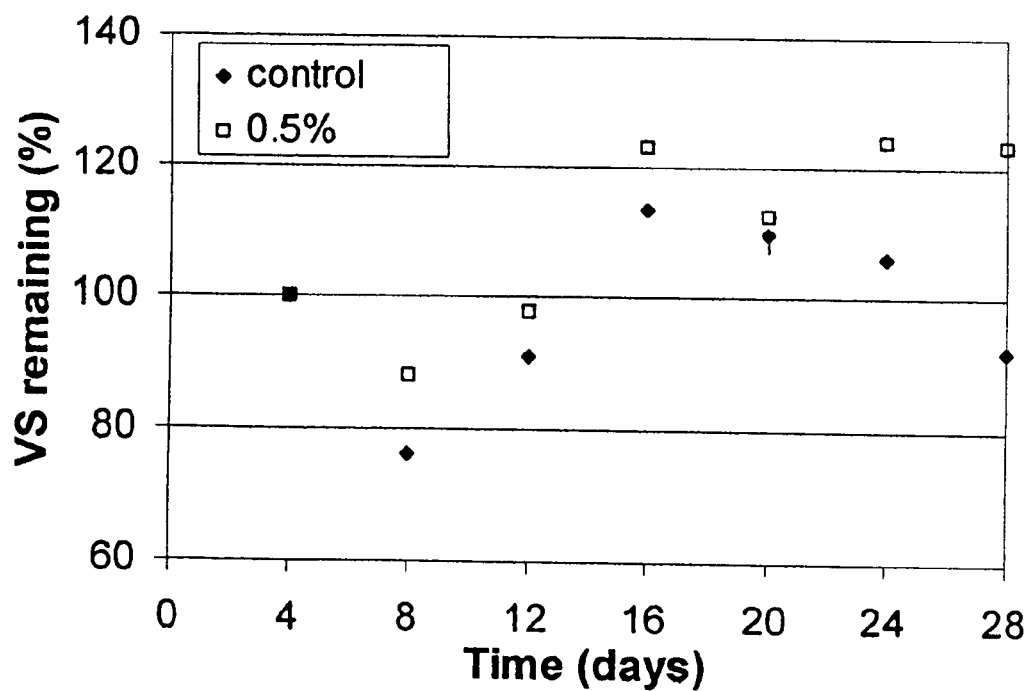
Figure 2. Volatile solids remaining versus time at 8°C.

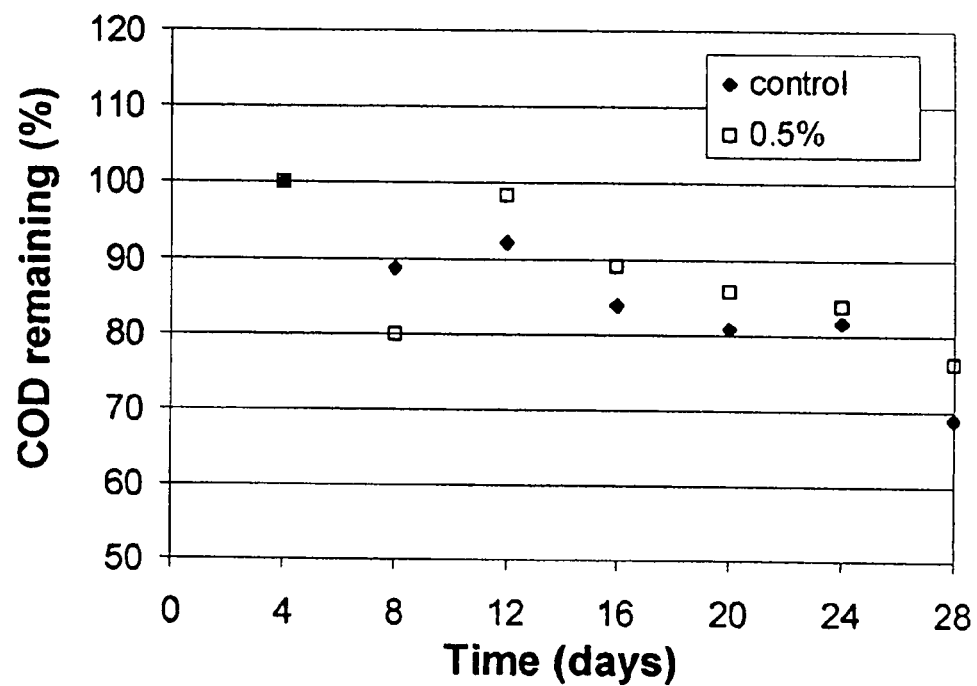
Figure 3. COD remaining versus time at 15°C.
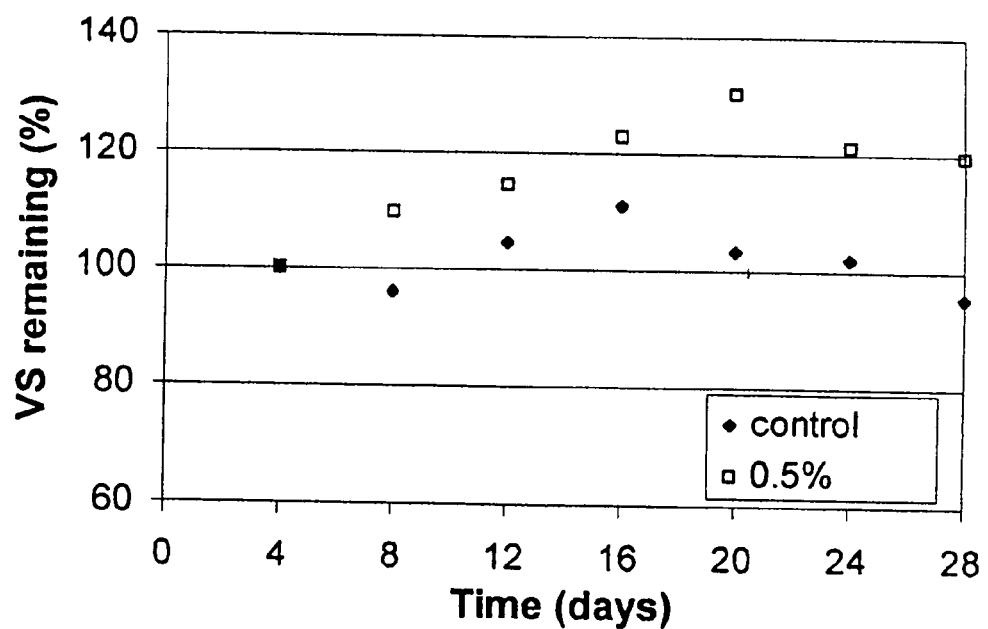
Figure 4. Volatile solids remaining versus time at 15°C.

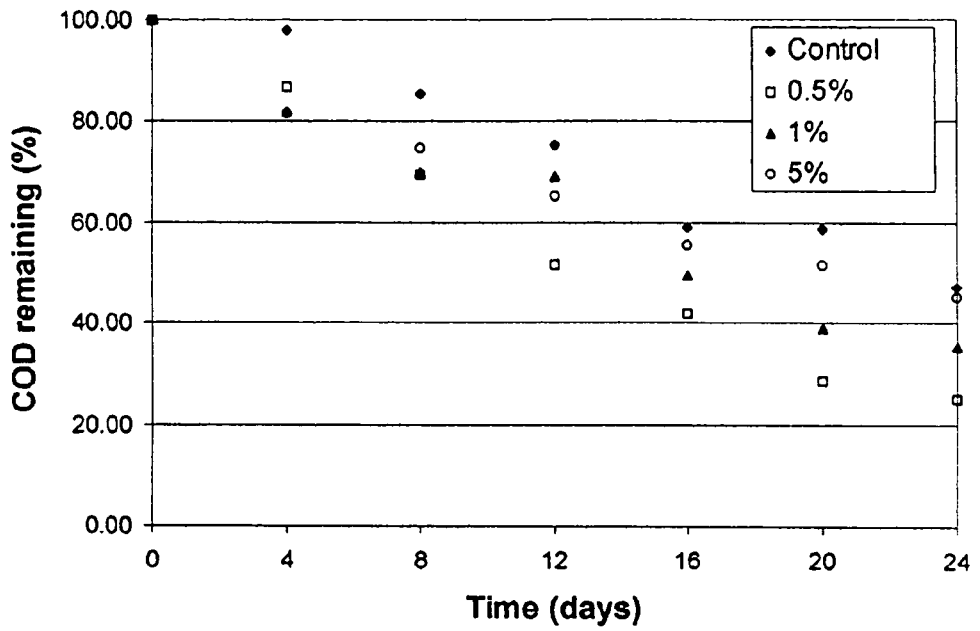
Figure 5 – COD remaining versus time at 23°C.
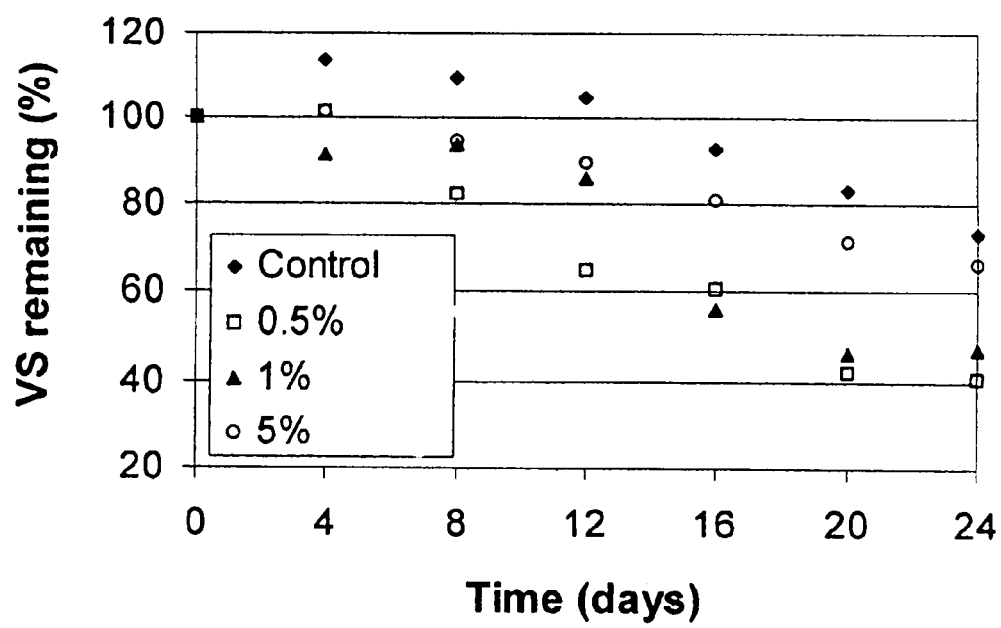
Figure 6 – Average volatile solids remaining expressed as a percentage of the volatile solids measured at the beginning of the trial period.

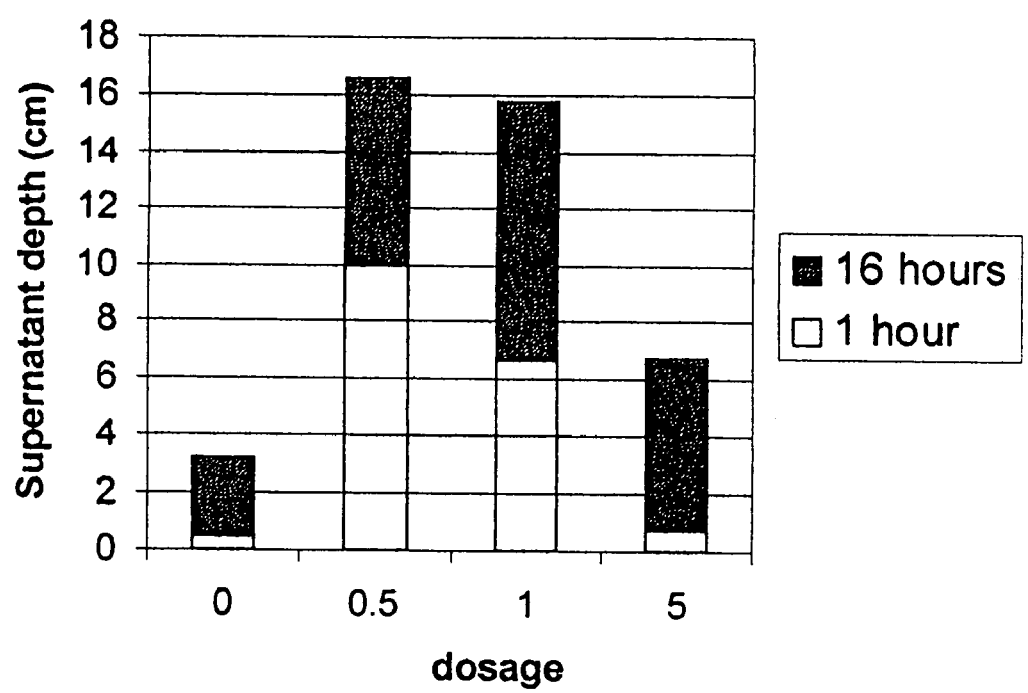
Figure 7 – Incremental depth of supernatant layer above settled sludge as a function of seed dosage.

WASTEWATER TREATMENT

The present application claims priority on Provisional Application Ser. No. 60/241,525 filed Oct. 17, 2000 and is a CIP of application Ser. No. 09/978,960 filed Oct. 16, 2001 now U.S. Pat. No. 6,656,357.

FIELD OF THE INVENTION

The present invention relates to the treatment of sludge from wastewater and other water treatment.

BACKGROUND OF THE INVENTION

Sludge is composed of solid and dissolved material in a liquid matrix. Important factors in the digestion process are the rate and extent of sludge digestion, and the extent to which water can be removed from the digested sludge. Sludge solids include both organic and inorganic material. Sludge digestion reduces the amount of organic solids in the sludge, but has no effect on the inorganic component. The biodegradable organic matter in the sludge is used as food by aerobic microorganisms (mostly bacteria) during aerobic sludge digestion. The products of this biodegradation are carbon dioxide, water and bacterial cells. As long as this food source and oxygen are readily available the aerobic bacteria continue to feed and multiply. As the removal of the non-living organic material originally present in the sludge nears completion, the microbial populations' growth rates slow until the death rate eventually exceeds the birth rate. Much of the dead bacterial cell material is then consumed by the survivors and the sludge is "digested".

The digested sludge can be de-watered by allowing it to stand under quiescent conditions, so that the solids settle and a layer of liquid supernatant forms above the settled sludge. This liquid is returned to the wastewater treatment plant for further treatment, and the de-watered sludge is trucked to its ultimate disposal point. Clearly, the more liquid that can be separated from the sludge at this stage, the lower the trucking costs will be.

While many methods have been suggested to aid in de-watering of digested sludge, only marginal improvement has been achieved.

A further problem associated with wastewater is in the treatment of sludge and odor associated with human waste such as may be found in sceptic tanks and the like. Sceptic tanks are used frequently for residential locations and/or other remote sites and are usually required to be pumped out every two years. In other locations, such as tourist lodges and the like, the sceptic tanks must be emptied on a yearly basis. If this is not done, and in some cases even with such action, the drainage field becomes fouled and an odor results.

A further problem associated with treatment of human waste resides in the use of portable toilets which are employed as temporary toilet facilities at many different sites. One of the major problems associated with their use is that of odor suppression. Generally, the portable toilets are pumped and cleaned weekly with the holding tank having an odor suppressant placed therein. Normally, such odor suppressants utilized a perfume type component to mask the odor rather than treating the same.

A different environmental problem is that associated with the growth of algae in various locations. In particular, the growth of algae in relatively stagnant bodies of water is an enormous problem for many ponds and lakes. Not only is the algae unattractive, but certain forms of algae can cause dermatological reactions with humans.

SUMMARY OF THE INVENTION

It is an object of the present invention to provide a method for the treatment of wastewater, and which method reduces the amount of sludge and reduces the amount of odor associated therewith.

It is a further object of the present invention to provide a method for the treatment of sceptic tanks to reduce the amount of sludge.

It is a further object of the present invention to provide a method for the suppression of odors associated with holding tanks for human waste.

It is a further object of the present invention to provide a method of clarifying bodies of water.

According to one aspect of the present invention there is provided a method for the treatment of wastewater containing human waste in a container comprising the step of applying to the sludge a biologically effective amount of composition containing a lignosulfonate and sludge digesting microbes.

According to a further aspect of the present invention there is provided a method for the suppression of odors in a holding tank containing human organic waste matter, the method comprising the step of adding to the organic waste material a biologically effective amount of a composition containing a lignosulfonate and organic material digesting microbes.

According to a still further aspect of the present invention there is provided a method for the treatment of a body of water containing algae and other organic matter, comprising the step of applying to the body of water a biologically effective amount of a composition containing lignosulfonate and sludge digesting microbes.

Lignins are a natural complex polymer which are generally produced as a co-product of the paper industry, the lignins being separated from the trees by a chemical pulping process. Lignosulfonates are also known as ligninsulfonates and sulfite lignins are products of sulfite pulping. Other delignifying technologies may include the use of an organic solvent or high pressure steam treatment to remove lignins from plants.

As aforementioned, lignin is a very complex natural polymer, the exact chemical structure not being known. Physical and chemical properties can differ depending on the extraction technology. Lignosulfonates have typically been used for their dispersing, binding, complexing and emulsifying properties. Lignins have been used for many years and extensive studies have been done to test lignin impact of the environment. To-date, lignins have been shown to be safe and non harmful to plants, animals and aquatic life when properly manufactured and applied. Furthermore, lignosulfonates have been found to be essentially non toxic and non irritating.

Surprisingly, it has been found that the use of the lignosulfonate with microbes is very efficient and cost effective way of reducing sludge volume.

The composition used in the present invention will preferably use microbes selected from those known to those knowledgeable in the art as being suitable for use in the treatment of sludge. As such, many such microbes have been used and are suitable for the practice of the present invention. Typical of such microbes, although the invention is not limited thereto, are those from the family Bacillus.

The microbial content of the composition may vary depending upon the material being treated and the results which are desired. It suffices to say that those knowledgeable in the art, given the teachings of the present invention, would be able to select the bacteria and amount thereon. Generally, it is preferred that the composition contain between 0.5% and 5% of a bacterial concentrate. Typically, such bacterial concentrates have a viable bacteria content (CFU) in the billions of organisms per gram. As such, the composition will have a microbial content of greater than 50,000 CFU per gram.

Preferably, the composition contains between about 80% to about 91.5% by weight of ammonium lignosulfonate, between about 8% and 15% by weight of a pH adjusting agent, and between about 0.5% and about 5% by weight of a concentrated microbial product. When the composition is utilized as a liquid, the dry composition may be mixed with water in a weight volume ration (grams/liters) of between 2:1 and 20:1.

The composition may be applied directly to the sludge and mixed therewith and/or could be applied as a liquid if so desired. Naturally, any other desirable material may be employed in the composition.

The composition can be utilized in sceptic tank treating systems or plants. However, the present invention also provides, in one particular embodiment, for the treatment of holding tanks. In particular, the present invention can be used in the treatment of holding tanks for recreational vehicles and the like and in the use of portable toilets.

One advantage of the present invention has been found to be a substantial odor reduction or suppression without the use of fragrances. This naturally presents a substantial advantage in the treatment of holding tanks and portable toilets.

As aforementioned, other ingredients can be added to the composition. Thus, although the present invention does achieve an odor suppression, if a particular fragrance is desired, then it could be added to the composition. Similarly, colorings such as dyes to provide a desired color for the composition can be incorporated.

The composition of the present invention can be used in treating holding tanks such as are encountered with recreational vehicles and for treating the sewage in portable toilets. At present, formaldehyde is widely used as a treatment for the suppression of odors. Naturally, the use of formaldehyde is undesirable from an environmental point of view. The composition of the present invention can achieve odor suppression equal to that achieved with formaldehyde while also providing a sludge digestion.

The present invention also contemplates the treatment of large bodies of water which contain algae and other suspended material. In this respect, the body of water may range from a small pond to larger lakes and the like. Again, due to the safety profile of ALS, such treatment is very useful in clarifying such bodies of water.

Initially, there will be shown herein various examples of treatment of different materials.

BRIEF DESCRIPTION OF THE DRAWINGS

The accompanying drawings are graphs illustrating the results of some of the examples set forth hereinbelow, and wherein:

FIG. 1 is a graph plotting COD remaining versus time at 8° C.;

FIG. 2 is a graph plotting volatile solids remaining versus time at 8° C.;

FIG. 3 is a graph plotting COD remaining versus time at 15° C.;

FIG. 4 is a graph plotting volatile solids remaining versus time at 15° C.;

FIG. 5 is a graph plotting COD remaining versus time at 23° C.;

FIG. 6 is a graph plotting average volatile solids remaining versus time; and

FIG. 7 is a graph showing the depth of the supernatant layer above the settled sludge.

DETAILED DESCRIPTION OF THE EXAMPLES

Having thus generally described the invention, reference will be made to the accompanying examples illustrating embodiments of the invention.

Sludge was collected from the aerobic digester tank at a municipal wastewater treatment plant. The sludge is composed of solids from primary settling tanks, and sloughed biomass from the facility's rotating biological contractors. A composition comprising ammonium lignosulfonate and bacteria were added thereto.

All measurements were conducted according to procedures specified in *Standard Methods for the Examination of Water and Wastewater*, 19$^{th}$ Edition.

Reduction of Organic Solids

The organic content of the sludge was characterized by two tests: Chemical Oxygen Demand (COD) was used as a measure of the overall organic content, and Volatile Solids (VS) measurements were used as a measure of the organic solids content. A comparison of the results of tests performed over the course of the study period will indicate the progress of the digestion.

Temperature Effects

The rate at which microorganisms degrade organic material decreases with decreasing temperature. Therefore, during the winter when ambient temperatures may reach lows near freezing, very little if any biological treatment occurs. During this period, the main function of the aerobic digester tanks is to hold the sludge until the return of warmer temperatures and the resumption of biological degradation. Any increase in biological activity during the protracted cold periods would improve the overall digestion efficiency. To see the effect of temperature, trials were run at 8° C., 15° C., and 23° C. for a period of 24 to 28 days.

Sludge De-watering and Settling Characteristics

As mentioned earlier, a major cost of operating a sewage treatment plant involves transportation of waste sludge. Clearly, an increase in the amount of water that can be removed from the sludge translates directly into reduced plant operating costs. Therefore, settling tests performed on digested sludge samples at the end of the test period will indicate any change in the volume of digested sludge. These tests use standard Imhoff cones in which sludge is allowed to stand for several hours.

In order to carry out this experiment, a special apparatus was employed. 40-3.8 L batch digesters were constructed. A 3 L volume of sludge was placed in each digester. Temperature control was achieved by placing batch digesters in temperature controlled water baths. For tests conducted below normal room temperature, digesters and water baths were housed in a temperature controlled room maintained at 8° C. The water bath temperatures within this room were set to 8° C. and 15° C., as appropriate. For the trials conducted at 23° C., batch digesters were placed in water baths set to 23° C. which were housed in a laboratory at normal room temperature. The batch digesters were covered to minimize water loss by evaporation and to prevent cross-contamination of digester contents. The digesters operated at 15° C. and 23° C. were also insulated with foam. The sludge temperatures were monitored to ensure that the temperatures were held constant.

Each digester was aerated via identical air pumps and diffuser stones. Aeration was checked to ensure it was sufficient to provide good mixing to each sample.

Each water bath contained 8 bath digesters arranged in two banks of four digesters. Each bank of four digesters was dosed with a different volume of the microbial composition at the start of the trial period, as shown in Table 1. The microbial composition was applied by first diluting it 1:20 and then adding a specific dose to each digester. Dosages are expressed as percentages of the total sample volume of 3 L (i.e. a dose of 0.5% represents 15 mL of the 1:20 dilution in 3 L of sludge).

TABLE 1

Experimental Conditions

| Digester Bank | Temperature | MicrobialDose |
|---|---|---|
| A1–A4 | 8° C. | 0% |
| A5–A8 | 8° C. | 0.5% |
| B1–B4 | 15° C. | 0% |
| B5–B8 | 15° C. | 0.5% |
| C1–C4 | 23° C. | 0.5% |
| C5–C8 | 23° C. | 1% |
| D1–D4 | 23° C. | 5% |
| D5–D8 | 23° C. | 0% |

Sampling Protocol

Due to the large number of samples to be withdrawn over the trial period, the size of each individual sample was kept relatively small. The sludge in each digester was sampled every four days. The sampling procedure involved the withdrawal of 10 mL of sludge from each digester. The samples were diluted with de-ionized water and blended to homogenize the samples. Blending was necessary to minimize the variability within each sample.

Total solids and total volatile solids tests were conducted rather than total suspended solids and volatile suspended solids tests because filtering the sample as required during the suspended solids tests was not possible due to the extremely high solids content of the samples. COD was measured using the closed reflux colorimetric method.

The Figures illustrate COD and VS measurements obtained over the course of this investigation, as well as a summary and illustration of the settling ability of sludge digested at 23° C. for a 24 day period. In order to facilitate comparison between digesters, COD and VS are expressed as percentages of the values measured on the first test day in the following section.

Trials Conducted at 8° C.

Reduction of Organic Content

Test results indicate that no measurable reduction of organic material occurred during digestion at 8° C. This is evident from both the results of COD tests indicated in FIG. 1, and the volatile solids measurements indicated in FIG. 2.

The COD and VS results were subject to considerable variability due to the variability inherent in the natural digestion process, and perhaps due to the small size of sample withdrawn from each digester. Paired-t tests applied to both the COD and VS results indicate that there is not significant difference (at the 0.05 significance level) between measurements made on samples withdrawn from digesters which had received no composition (control digesters) and those digesters which had the microbial composition added.

De-watering Potential of Sludge

Settling tests using an Imhoff cone indicated that little if any settling occurred within the standard test settling time of 1 hour for either the doses or control sludge samples. A supernatant layer of approximately 1 mm had formed within the first hour of settling, and no further settling was observed after the samples were allowed to stand overnight.

Trials Conducted at 15° C.

Reduction of Organic Content

Samples from digesters maintained at 15° C. were found to have a slight reduction in COD over time. The trend of COD decreasing with time is shown in FIG. 3. This indicates that the microorganisms were more active at this higher temperature, as expected. However, paired-t test results indicate that there is no significance difference in the percent COD remaining in control and seeded sludge at a 0.05 significance level. Therefore, there is no evidence that the microbial material had a significant effect on aerobic digestion of the sludge at 15° C.

The results of volatile solids measurements on samples of sludge digested at 15° C. are shown in FIG. 4. The volatile solids are seen to increase over the first 12 to 14 days of digestion. This may be due to microorganisms feeding on soluble organic material and the population of microorganisms increasing. This would explain increasing volatile solids content at the same time as decreasing overall organic content. However, any inference drawn from these data must be viewed with caution as there was considerable variability in both COD and VS measurements in samples from the individual digesters. The mean 95% confidence limits on COD measurements is ±1.7%, and ±14.5% for the volatile solids (VS) measurements. The results of a paired-t test conducted at a 0.05 significance level on the VS measurements indicate that the volatile solids in the seeded digesters are greater than those in the control digesters.

De-watering Potential of Sludge

The settling behavior of sludge samples from digesters maintained at 15° C. was found to be the same as that of the sludge samples from the digesters maintained at 8° C. Settling of approximately 1 mm was observed after the standard 1 hour period, and no further settling was observed after allowing the samples to stand overnight.

Trials Conducted at 23° C.

Reduction of Organic Content

The results from trials conducted at 23° C. indicate that considerable digestion occurred in each of the digesters. FIG. 5 contains a comparison of the average percent COD remaining in the four digester banks over the trial period. These results indicate that the average percent reductions of COD in digesters ranged from a low of approximately 50% in the control digesters, to a high of approximately 75% in the digesters that had been dosed with 0.5% composition. It must be noted that the COD removal varied considerably from one digester to another within each bank of digesters. For instance, for the control digesters, the COD removals ranged from 42 to 70%, while those in the digesters which had received 0.5% composition doses ranged from 57 to 94%. The 95% confidence intervals about the average COD measurements are ±15.3%, ±31.2%, ±18.0%, and ±15.3% for the banks of digesters which had received 0%, 0.5%, 1% and 5% seed, respectively.

An inverse relationship was observed between product dosage and COD removal. This same trend is noted in the VS results shown in FIG. 6.

Population growth can be limited by the availability of organic substrate, nutrients or oxygen. In the present case, organic substrate, nutrients and oxygen were present in abundance, and microorganisms may have been experiencing exponential population growth throughout the trial period. The oxidizable material contained in biological cells contributes to both the measured COD and VS. Thus, the rapid reproduction of microorganisms themselves may have contributed to the observed trend of the remaining COD and VS increasing with increasing dosage of the composition.

The time required to reach the endogenous growth phase, in which the death rate exceeds birth rate, can be expected to decrease with increasing dosage. This phase begins when the availability of dead organic material limits the microbial growth rate, and can be identified by a reduction in the rate of COD removal and an increase in the rate of VS reduction. This phase was not reached during the present investigation, as may be inferred FIGS. 5 and 6.

De-watering Potential of Sludge

FIG. 7 illustrates the formation of a supernatant layer above samples of digested sludge. The lower portion of each bar represents the depth of supernatant observed after 1 hour. The hatched upper portion of each bar represents the increase in the supernatant depths observed after the samples were allowed to settle overnight. The total depth supernatant after 16 hours settling is the sum of the incremental supernatant depths. The settling ability of the digested sludge samples was observed to be strongly dependent on the amount of composition originally added to the sludge. The sludge which had received 0.5% and 1% product were observed to settle extremely well relative to the control sample. The supernatant layers that formed above the samples inoculated with 5, 1, and 0.5% product volumes were 2.1, 4.9, and 5.2 times deeper, respectively, than the layer that formed above the control sample.

The results obtained during this investigation indicate that no measurable digestion occurred in the aerobic digesters maintained at 8° C. This temperature is representative of winter conditions, under which the primary function of the sludge digesters is to store sludge in an aerobic state. Additions of the microbial composition had no noticeable effect on the sludge digestion under this condition.

The results obtained from digesters maintained at 15° C. indicated that the use of the microbial composition did not improve digestion or sludge settling characteristics over the trial period.

The results for the trials conducted at 23° C. indicate that a considerable amount of digestion was taking place. Both organic solids and COD were reduced and sludge settling characteristics were improved during the trial period. Moreover, the test results provided strong evidence to indicate that the microbial composition had enhanced the process of aerobic digestion at this temperature. The reduction in volatile solids and COS was greatest in those samples treated with a low dose (0.5% by volume) of the product solution. These results indicate that for relatively short digestion periods, during which microbial populations can be expected to be experiencing exponential growth, the dosage applied may have a considerable effect on sludge quality. It should be noted, however, that higher doses can be expected to decrease the time required for the microbial populations to enter the endogenous growth phase. Therefore, higher dosages may enhance digestion in cases where digestion is allowed to proceed further than in the present study where considerable COD removal was still occurring at the close of the trial period.

The settling test provided perhaps the most dramatic evidence of the effectiveness of the composition. The depth of the supernatant layer that formed above the digested sludge increased 5 fold from 3.2 cm for the control samples to 16.6 cm for the sludge which had received a 0.5% dosage. This suggests that a considerable reduction in the volume of sludge that must be trucked can result from the application of the microbial product under certain conditions.

From the above, it will be seen that the use of a composition containing ammonium lignosulfonate and a microbial product can significantly reduce the amount of sludge which must be trucked for treatment.

Portable Toilet Odor Suppressant Test

The composition was tested with a contractor for portable toilets. The test was conducted in the Southern United States, the Virgin Islands and Brazil. Two ounce, three ounce and four ounce packages of the composition were forwarded to the contractors. The lemon scent and blue colorant were added to certain samples for acidic purposes.

The results from the Southern United States reported that the product was superior to all other products tried by the contractor who reported that this was the most complete decomposition ever seen.

The report from the contractor in the Virgin Island facilities was that all odor was suppressed in both the three ounce and four ounce size samples.

The Brazilien tests were also positive.

The test was conducted with portable toilets which generally have a five gallon reservoir. Previous methods of treatment included various chemicals (usually formaldehyde) colored blue with an added fragrance to mask the odors.

Recreational Vehicle Holding Tanks

The product was tested in a household in California. Two ounces of the composition was added to the holding tank and the owner reported that they were able to go for two months at a time without dumping and with no smell. This was a substantial improvement over the previous experience.

Treatment of Algae in a Body of Water

At a residential site, a large oval pond of approximately seventy (70) feet by one hundred and seventy (170) feet having an average depth of approximately six (6) feet and containing approximately three million liters of water was selected. The water supply consisted of an inflow from a neighboring pond on a neighbor's land as well as from numerous water sources along with the rain water flow from land sites around the pond. The pond was infested with a large amount of algae and was in degradation due to the algae and the organic deposits. The level of the pond is controlled by a drain which maintains the upper level of the water at the same level regardless of the feed volume.

Traditional treatment in order to overcome the problem consisted of an oxygenator/fountain to circulate the water and to create a large volume of water in contact with the air. A hand held skimmer has also been used to remove excessive surface algae. Despite the above, the algae continued to form and there is an odor from the stagnant water.

A four kilogram pail of the product was manually spread over the entire surface of the pond using a boat. Some was also applied to certain sections of the pond where there was large deposits of surface algae by the shoreline. The product immediately started sinking to the bottom of the pond.

After one day, the pond was inspected and it was recorded that a large percentage of the algae had already disappeared and the water was clearer.

Six days later, a further four kilogram pail of the product was sprinkled over the entire surface of the pond.

Two weeks later after the date of the second treatment, pictures were taken demonstrating a lack of surface algae and it was noted that the water was clear to a depth of three feet.

Three weeks after the treatment, a visual inspection revealed that the water was clarified down to a depth of approximately six feet.

Five weeks after the treatment, it was verified that the water was still clear to a depth approaching seven feet.

It will be understood that the above described embodiment is for purposes of illustration only and that changes or modifications can be made thereto without departing from the spirit and scope of the invention.

I claim:

1. A method for the treatment of wastewater sludge containing human waste in a container comprising the step of applying to said sludge a biologically effective amount of composition containing a lignosulfonate and sludge digesting microbes.

2. The method of claim 1 wherein said lignosulfonate is ammonium lignosulfonate.

3. The method of claim 2 wherein said sludge digesting microbes are from the genus *bacillus*.

4. The method of claim 2 wherein said composition has a pH of between 6.5 and 7.5.

5. The method of claim 4 wherein said composition contains between about 80% to about 91.5% by weight of ammonium lignosulfonate, between about 8% and about 15% by weight of a pH adjusting agent, and between about 0.5% and about 5% by weight of a concentrated microbial product.

6. The method of claim 5 wherein said pH adjusting agent is lime.

7. The method of claim 5 further including the step of mixing said composition with water in a weight volume ratio (grams/liters) of between 2:1 and 20:1.

8. A method for the suppression of odors in a holding tank containing human organic waste matter, the method comprising the step of adding to said organic waste material a biologically effective amount of a composition containing a lignosulfonate and organic material digesting microbes.

9. The method of claim 8 wherein said lignosulfonate is ammonium lignosulfonate.

10. The method of claim 9 wherein said sludge digesting microbes are from the genus *bacillus*.

11. The method of claim 9 wherein said composition has a pH of between 6.5 and 7.5.

12. The method of claim 11 wherein said composition contains between about 80% to about 91.5% by weight of ammonium lignosulfonate, between about 8% and about 15% by weight of a pH adjusting agent, and between about 0.5% and about 5% by weight of a concentrated microbial product.

13. The method of claim 12 wherein said pH adjusting agent is lime.

14. The method of claim 12 further including the step of mixing said composition with water in a weight volume ratio (grams/liters) of between 2:1 and 20:1.

15. A method for the treatment of a body of water containing algae and other organic matter, comprising the step of applying to said body of water a biologically effective amount of a composition containing lignosulfonate and sludge digesting microbes.

\* \* \* \* \*